(12) United States Patent
Schmidt-Karaca

(10) Patent No.: US 10,839,329 B2
(45) Date of Patent: Nov. 17, 2020

(54) PROCESS EXECUTION USING RULES FRAMEWORK FLEXIBLY INCORPORATING PREDICTIVE MODELING

(71) Applicant: SAP SE, Walldorf (DE)

(72) Inventor: Markus Schmidt-Karaca, Heidelberg (DE)

(73) Assignee: SAP SE, Walldorf (DE)

( * ) Notice: Subject to any disclaimer, the term of this patent is extended or adjusted under 35 U.S.C. 154(b) by 1059 days.

(21) Appl. No.: 15/333,745

(22) Filed: Oct. 25, 2016

(65) Prior Publication Data

US 2018/0114135 A1  Apr. 26, 2018

(51) Int. Cl.
| | |
|---|---|
| *G06Q 10/10* | (2012.01) |
| *G06Q 10/06* | (2012.01) |
| *G06F 9/44* | (2018.01) |
| *G05B 23/02* | (2006.01) |
| *G06N 5/02* | (2006.01) |

(52) U.S. Cl.
CPC ......... *G06Q 10/0637* (2013.01); *G06N 5/025* (2013.01)

(58) Field of Classification Search
CPC .......................... G06Q 10/0637; G06N 5/025
USPC ....................................................... 706/1–62
See application file for complete search history.

(56) References Cited

U.S. PATENT DOCUMENTS

| | | | |
|---|---|---|---|
| 7,739,693 | B2 | 6/2010 | Bernhard et al. |
| 7,831,734 | B2 | 11/2010 | Bernhard et al. |
| 8,060,487 | B2 | 11/2011 | Schmidt-Karaca |
| 8,407,297 | B2 | 3/2013 | Schmidt-Karaca et al. |
| 8,572,369 | B2 | 10/2013 | Schmidt-Karaca et al. |
| 8,604,973 | B2 | 12/2013 | Schmidt-Karaca et al. |
| 8,713,560 | B2 | 4/2014 | Neumann et al. |
| 9,183,542 | B2 | 11/2015 | Schmidt-Karaca |
| 9,262,763 | B2 | 2/2016 | Peter et al. |
| 2003/0023657 | A1 | 1/2003 | Fischer et al. |
| 2003/0037254 | A1 | 2/2003 | Fischer et al. |
| 2003/0046017 | A1 | 3/2003 | Fischer et al. |
| 2003/0046448 | A1 | 3/2003 | Fischer et al. |
| 2003/0055927 | A1 | 3/2003 | Fischer et al. |
| 2003/0056207 | A1 | 3/2003 | Fischer et al. |
| 2004/0177361 | A1 | 9/2004 | Bernhard et al. |
| 2004/0199611 | A1 | 10/2004 | Bernhard et al. |
| 2004/0230670 | A1 | 11/2004 | Schmidt-Karaca et al. |
| 2005/0289350 | A1 | 12/2005 | Schmidt-Karaca et al. |

(Continued)

OTHER PUBLICATIONS

"Developer's Guide for SAP Business Objects Predictive Analytics integrator," retrieved from http://help.sap.com/businessobject/product_guides/pai11/en/pai11_developer_guide_en, on or before Jul. 13, 2016, 54 pages.

(Continued)

*Primary Examiner* — Brandon S Cole
(74) *Attorney, Agent, or Firm* — Klarquist Sparkman, LLP

(57) ABSTRACT

A specification of the process model is received. The process model includes a plurality of process components. A relationship between a first process component and another process component of the plurality of process components is determined using a predictive model. A process rule for the first process component is determined. The process rule specified a second process component to be executed. The process rule includes the relationship determined using the predictive model or a heuristic rule. The second process component is executed according to the process rule.

20 Claims, 7 Drawing Sheets

(56) References Cited

U.S. PATENT DOCUMENTS

| | | | |
|---|---|---|---|
| 2007/0027866 A1 | 2/2007 | Schmidt-Karaca et al. | |
| 2008/0082575 A1 | 4/2008 | Markus et al. | |
| 2009/0106371 A1 | 4/2009 | Schmidt-Karaca et al. | |
| 2009/0106372 A1 | 4/2009 | Schmidt-Karaca et al. | |
| 2010/0121924 A1 | 5/2010 | Schmidt-Karaca et al. | |
| 2011/0145571 A1 | 6/2011 | Schmidt-Karaca et al. | |
| 2011/0154445 A1 | 6/2011 | Schmidt-Karaca et al. | |
| 2012/0133553 A1 | 5/2012 | Schmidt-Karaca et al. | |
| 2012/0136839 A1* | 5/2012 | Eberlein | G06F 16/2315 707/690 |
| 2013/0166417 A1 | 6/2013 | Pulkowski et al. | |
| 2013/0167135 A1 | 6/2013 | Neumann et al. | |
| 2013/0326464 A1* | 12/2013 | Hermanns | G06Q 10/067 717/100 |
| 2016/0004826 A1* | 1/2016 | Van Arkel | G06Q 10/10 705/3 |
| 2019/0339687 A1* | 11/2019 | Cella | G05B 23/0229 |

OTHER PUBLICATIONS

"Own Your Business Logic With Business Rules Framework plus," retrieved from http://go.sap.com/documents/2015/08/f69e0924-577c-0010-82c7-eda71af511fa.html, 2010, 77 pages.

"SAP Fiori® User Experience—SAP S/4HANA—Architecture Deep Dive," retrieved https://experience.sap.com/documents/sap-fiori-ux-architecture-for-s4h, on or before Jan. 20, 2016, 62 pages.

"SAP HANA Predictive Analysis Library (PAL)," retrieved from http://help.sap.com/hana/sap_hana_predictive_analysis_library_pal_en, on or before Sep. 13, 2016, 578 pages.

"SAP Predictive Analytics & HANA Unified Model Management," asug 25 Years of Disruption, retrieved from http://help.sap.com/hana/sap_hana_predictive_analysis_library_pal_en, on or before 2016, 10 pages.

"What is PAL?" retrieved from http://help.sap.com/saphelp_hanaplatform/helpdata/en/c9/eeed704f3f4ec39441434db8a874ad/content.htm, 2014, pp. 1-3.

Barzewski, Alfred, "Introduction to Business Object Processing Framework (BOPF)," retrieved from https://archive.sap.com/documents/docs/DOC-45425, on or before Mar. 15, 2016, pp. 1-4.

Dowling, Kelly, "5326—Interactive ASUG Influence: Predictive Analytics Integration with SAP HANA Unified Model Management," retrieved from https://discuss.asug.com/docs/DOC-44785, on or before May 25, 2016, 1 page.

Hillenbrand, Thea, "E2E: BOPF-SADL-GW-SAPUI5—Introduction," retrieved from https://blogs.sap.com/2015/02/12/e2e-bopf-sadl-gw-sapui5-introduction, 2015, pp. 1-15.

* cited by examiner

PROCESS EXECUTION USING RULES FRAMEWORK FLEXIBLY INCORPORATING PREDICTIVE MODELING

FIELD

The present disclosure generally relates to executing a process according to a plurality of rules. Particular implementations relate to executing the process in conjunction with a rules framework, where a ruleset for the process can include heuristic rules and rules derived from a predictive model.

BACKGROUND

Computing systems are often used to oversee and facilitate the execution of complex processes having many steps and decision points. For example, computing systems may be used to carry out complex financial analyses, or to govern the administration of benefit programs, including adding individuals to a benefit administration system, determining benefit eligibility, and processing any benefits to which an individual may be entitled.

In some cases, the individual steps of a process may be required to be carried out in a particular order. For example, legal requirements may dictate that certain actions be performed in particular situations. In other cases, at least some steps of a process may be carried out in varying orders, or certain steps may be added to, or removed from, the process. Carrying out process steps in a different order, or changing the steps included in a process, can affect both the outcome of the process and the efficiency of the process. For instance, it may be possible to achieve the same outcome by two different paths of process steps, but with one path taking less time or effort than the other.

In many cases, a process is carried out in a particular way either because of legal or other requirements, because of historical reasons (a process that was set up in a particular way continues to be carried out in that manner because it has become the established method), using heuristics, or simply because a methodology needed to be established (such as to ensure a process was carried in a consistent/uniform manner). However, while relying on established methods and heuristics can provide some benefits, and can be comparatively easy to implement, it may not produce optimal results, or the most efficient process.

Predictive analysis or modeling, including using machine learning techniques, has been used to analyze processes, and can sometimes identify more efficient or optimal processes. However, predictive analysis often requires specialized knowledge that may be beyond the technical expertise of those designing or implementing processes. In addition, predictive analysis typically relies on a large volume of training data. When a process is to be designed or implemented, the training data may not be available. Once a process has been designed, it may be difficult to change the process even if optimizations were uncovered. Thus, there remains room for improvement in the design and execution of processes using a computing system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the execution of a process, such as a process specified by a process model specification. According to a particular method, a specification of the process model is received. The process model includes a plurality of process components. A relationship between a first process component and another process component of the plurality of process components is determined using a predictive model. A process rule for the first process component is determined. The process rule specifies a second process component to be executed. The process rule includes the relationship determined using the predictive model or a heuristic rule. The second process component is executed according to the process rule.

According to another method, a ruleset is defined for a process using a plurality of heuristic rules. The process includes a plurality of process components. A predictive model is defined for at least a portion of the plurality of process components. The process is executed according to the ruleset. The predictive model is trained using data obtained during the executing. A rule for the process model specification is determined using the predictive model. The ruleset is revised to include the determined rule. The process is executed according to the revised ruleset.

In another aspect, the present disclosure provides a system that implements a process control engine. The system includes one or more memories, one or more processing units coupled to at least one memory of the one or more memories, and one or more non-transitory computer readable storage media. The storage media include instructions that, when loaded into the memories, cause the processing units to perform operations. The operations include implementing a computing platform that includes a process control engine. The process control engine executes a process specification that includes a plurality of process components. The operations implement a rules framework in communication with the process control engine. A database that includes a data store and a predictive modeling engine is also implemented by the operations. The operations further include determining a rule of the rule framework using the predictive modeling engine, and executing with the process control engine, and according to the rule, at least one of the plurality of process components.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
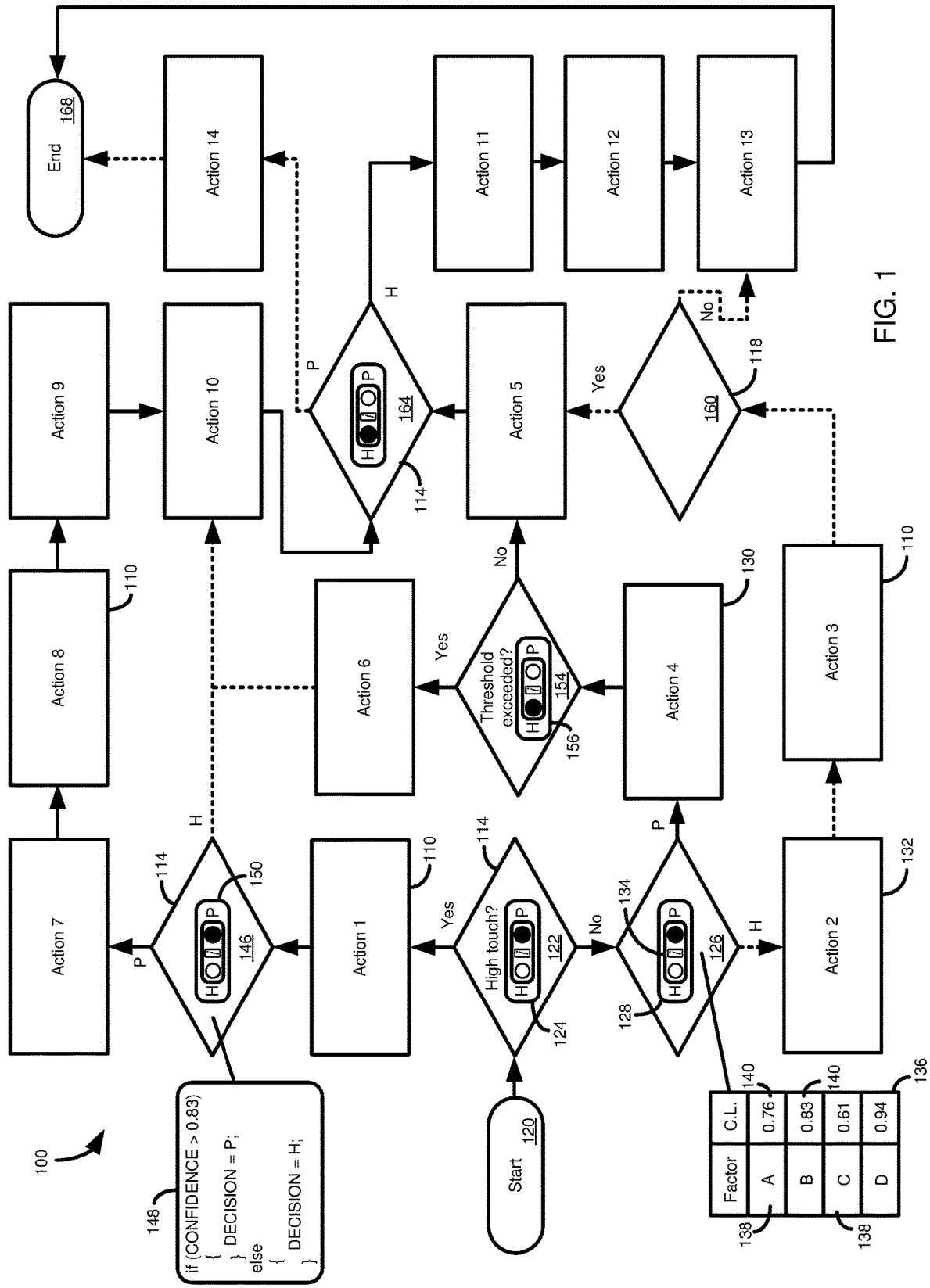
FIG. 1 is a diagram schematically depicting a process model specification having a plurality of process model components and a plurality of configurable rules determining relationships between the process model components.

Computing systems are often used to oversee and facilitate the execution of complex processes having many steps and decision points. For example, computing systems may be used to carry out complex financial analyses, or to govern the administration of benefit programs, including adding individuals to a benefit administration system, determining benefit eligibility, and processing any benefits to which an individual may be entitled.

In some cases, a process can be modeled, such as using a flowchart or similar diagram. Various schemas have been created to model processes, including workflows. For example, workflows can be defined in the Unified Modeling Language (UML) or Business Process Model and Notation (BPMN). These tools can provide standardized ways for defining, or modeling, processes, such as workflows.

In some cases, the individual steps of a process may be required to be carried out in a particular order. For example, legal requirements may dictate that certain actions be performed in particular situations. In other cases, at least some steps of a process may be carried out in varying orders, or certain steps may be added to, or removed from, the process. Carrying out process steps in a different order, or changing the steps included in a process, can affect both the outcome of the process and the efficiency of the process. For instance, it may be possible to achieve the same outcome by two different paths of process steps, but with one path taking less time or effort than the other.

In many cases, a process is carried out in a particular way either because of legal or other requirements, because of historical reasons (a process was set up in a particular way continues to be carried out in that manner because it has become the established method), using heuristics, or simply because a methodology needed to be established (such as to ensure a process was carried in a consistent/uniform manner). However, while relying on established methods and heuristics can provide some benefits, and can be comparatively easy to implement, it may not produce optimal results, or the most efficient process.

Predictive analysis or modeling, including machine learning techniques, has been used to analyze processes, and can sometimes identify more efficient or optimal processes. However, predictive analysis often requires specialized knowledge that may be beyond the technical expertise of those designing or implementing processes. In addition, predictive analysis typically relies on a large volume of training data. When a process is to be designed or implemented, the training data may not be available. Once a process has been designed, it may be difficult to change the process even if optimizations were uncovered. Thus, there remains room for improvement in the design and execution of processes using a computing system.

The present disclosure provides an integrated process management system whereby process steps can be determined by predetermined rules or the results of applying predictive analysis to a model of the process. In at least some cases, the determination of whether to use the predetermined rules (generally referred to hereinafter as heuristics) or the results of predictive analysis can be made for individual steps of the process. For example, certain steps may be determined by heuristics, while other steps may be based on predictive analysis.

In particular aspects, the rules governing the execution of all or a portion of the steps in a process can be changed from heuristic rules to rules derived from predictive analysis, and vice versa. For example, a process can be defined using heuristic rules, and one or more of the rules later modified to use the results of predictive analysis, such as after training data has been generated and a useful predictive model obtained. Advantageously, providing the ability to transition from heuristic rules to rules provided by predictive analysis can allow a process to take advantage of predictive analysis without having to acquire a large set of training data. Additionally, because the process can transition between heuristic rules and rules derived from predictive analysis, implementing rules based on predictive analysis does not require the adoption or creation of a completely new process.

Example 2—Example Process Specification

FIG. 1 illustrates a process 100 that includes a plurality of process components, such as activities or tasks 110, and a plurality of decision points 114, where the execution order of process components can be determined either by heuristic rules or rules derived from predictive analysis. The process 100 can include additional features, such as a decision 118 that is made as part of the process 100 regardless of whether the inclusion of particular components, or their execution order, is directed by heuristics or predictive analysis, although the decision can be based on a predictive model. In other cases, the process 100 can include decisions that are not tied to a heuristic rule or a rule derived from a predictive model, but are a fixed feature of the process.

The process 100 begins at 120. Decision 122 makes a particular determination, which can be made using either a heuristic or a rules derived from predictive analysis. Whether heuristics or predictive analysis is to be used can be selected, such as by a user (for example, a systems administrator or manager), using a selector 124. As shown, the selector 124 indicates that predictive modeling (e.g., machine learning) should be used. In a particular example, some types of situations may be classified as "high touch" or "low touch." A low touch case may be one that is relatively straightforward and can be processed in an automated or expedited manner. A high touch case may be one that requires manual intervention, or additional process steps or components for execution.

By setting the selector 124 to use heuristics, the determination of whether a situation is classified as high touch or low touch can be made using a set of criteria. For example, when the situation involves processing of benefits for an individual, the individual's age may be used as a criteria for determining whether to process a benefit claim or determination as high touch. If, for example, the individual is under age 18, benefit processing may require direct interaction by a claims processor with the individual. If the individual is over age 18, direct interaction with a claims processor may not be required, and therefore the benefit processing may be carried out in an automated manner.

Other types of criteria may be used to determine whether a situation is classified as high or low touch at decision 122. For instance, in the benefit context, the prior history of the individual, the financial situation of the individual, the type of benefits for which the individual may be eligible, the geographical location of the individual, additional factors, or combinations thereof, may be used in the determination. As with age, a heuristic rule can be used to determine whether a situation should be considered high or low touch.

However, the heuristic rule may be suboptimal. For example, the rule may improperly classify individuals in certain situations. Unnecessarily classifying an individual as high touch may result in a claims processor becoming involved in the situation, which can increase the overhead of processing the claim (because of the man-hours needed in processing the claim) and potentially delay claim processing, which may lead to customer dissatisfaction. However, misclassifying a high touch situation as low touch may result in compliance issues or misprocessing of benefits. To avoid compliance or other issues, a heuristic rule may err on the side as classifying situations as high touch.

The relationship between the factors that can determine whether a situation should be high touch can be complex, and difficult to analyze a priori, or even after data has been acquired, using manual analysis. Predictive analysis can be used to analyze a training data set to uncover relationships that can allow more accurate and precise determination of whether a situation can be treated as low touch, or should be treated as high touch. However, as discussed above, when the process 100 is initially created, the data may not be available to implement decision 122 using predictive analysis. Thus, the process 100 can be initially designed with the selector 124 set to use the heuristic rule. At a later time, the process 100 can be modified to use predictive analysis at decision 122. For example, once a user is satisfied with the performance of a predictive model, the user can set the selector 124 to use predictive analysis rather than heuristics.

If the decision 122 determines that the situation is low touch, the process 100 can continue at decision 126. Decision 126 includes a selector 128 that can be used to determine whether the process 100 should proceed as indicated by a heuristic or using the results of a predictive model. As shown, the selector 128 is set to use the results of a predictive model, which indicates that a task or action 130, action 4, should be carried out. In contrast, the heuristic would direct that a task or action 132, action 2, should be carried out. Although decision 126 indicates that a different task or action should be carried out using the results of the predictive model than would be directed by a heuristic, in other cases, the predictive model and the heuristic can indicate that the same task or action should be taken. The task or action indicated by the predictive model can change over time, such as if the model is adjusted, a different predictive algorithm is used in, or to analyze, the model, or as the model processes more data. In some cases, when the selector 128 indicates that the predictive model should be used to determine the next component to be executed, the process 100 can dynamically adjust itself to implement the new process flow. In other cases, a user may be alerted that the predictive model indicates that a change to the process 100 may be desirable, and the user can determine whether to update the process.

To assist the determination of whether a task or action 110, decision 114, or other component of the process 100 should be carried out using heuristics, or predictive analysis should be applied, information about the predictive analysis may be displayed or analyzed. For example, the selector 128 may provide an information icon 134. By selecting the icon 134, information regarding the predictive model associated with decision 126 (or the model in general) can be provided, such as being displayed to a user. As shown, a table 136 displaying factors 138 and their associated confidence levels 140 from the predictive model can be displayed. A user can review the table 136 and determine whether the confidence levels 140 associated with the factors 138 are sufficiently high that the predictive model is likely to provide acceptable performance, such as performance that is equal to or better than the performance of the process using a heuristic at decision 126.

In other cases, the decision regarding whether a heuristic rule or a rule derived from a predictive model should be used to determine the outcome of a decision 114, or which process component should next be executed, can be made in another manner. For example, decision 146 uses a rule or algorithm to decide whether a heuristic or predictive model should be used to determine the component to be executed in the process 100. The rule is shown in callout 148, and states that if the confidence of factor A is greater than 0.83, the predictive model should be used to determine next component to be executed. If the confidence of factor. A is not greater than 0.83, the heuristic rule will be used. Thus, the process 100 may be set to automatically transition to the predictive model, at least for certain decisions 114, or rules, when specified criteria are met. In at least some cases, a user may be allowed to override an automatic determination of whether a heuristic rule or predictive model rule should be used. For instance, decision 146 includes a selector 150. The selector 150 may indicate the result of using the rule 148, but may be overridden by a user manually selecting the predictive model or heuristic using the selector.

As another example of how decision points 114, or other process execution components, can transition between heuristics and predictive modeling, decision 154 determines whether a first action 110, action 5, or a second action, action 6, should be carried out by determining whether a threshold value is exceeded. Initially, the threshold value can be set using a default value or heuristic. The threshold value may be higher or lower than the optimal threshold value. As data is acquired through execution of the process 100, a predictive model can use the data to analyze the steps of the process. The predictive model may determine a threshold value suggested for use at decision 154.

At some point, the threshold value suggested by the predictive model may be more accurate than the value supplied by the heuristic. Accordingly, when a user determines that the predictive model has been trained to an appropriate degree, the user can change decision 154 to operate using rules based on predictive analysis, such as using a selector 156. Or, a system can be configured to automatically transition to using rules based on predictive analysis when a confidence level meets or exceeds a threshold, or using similar criteria. In other cases, the determination of when to switch to rules based on predictive analysis can be made in other ways, such as determining when a sufficient amount of time has elapsed for process training, or a threshold number of data points for use in training the model has been met or exceeded.

A process 100 can include decisions 118 that are an inherent part of the process, and not affected, including in some cases not being directly affected, by whether other parts of the process are carried out using heuristics or predictive analysis. In some cases, certain decisions or rules can act as boundaries for the process 100. In addition, when a particular rule is potentially to be decided using predictive analysis, the potential outcomes of the predictive analysis can be constrained by boundaries. For example decision 160 may direct that a first action 110, action 5, be carried out if the decision is positive, and a second action, action 13, be taken if the decision is negative. As an example, in case of benefits processing, decision 160 may determine whether or not a subject is eligible for Medicare or Medicaid. This determination, and the subsequent actions 110 to be taken, may be a fixed part of the process 100.

FIG. 1 illustrates that the use of predictive analysis can simplify the process 100. For example, at decision 164, a heuristic may indicate that a number of actions 110, actions 11-13, should be taken before the process 100 ends at 168. However, after the process 100 is analyzed using a predictive model, the predictive model may determine that the process could be executed simply by carrying out another action 110, action 14. Thus, just by applying the predictive model to decision 164, a net elimination of two actions 110 from the process 100 can be achieved.

Although FIG. 1 illustrates specific connections between tasks 110 and decisions 114 depending on whether a decision is made based on heuristics or predictive analysis, it should be appreciated that FIG. 1 can represent the state of the process 100 at a particular time. As the predictive model is trained and refined, it can evaluate new connections between process components. For example, while decision 154 is shown as indicating that an action 110, action 6, should be carried out, the predictive model may be analyzing whether other actions 110 or decisions 114 would result in more accurate or efficient execution of the process 100.

While FIG. 1 illustrates a single connection based on a predictive model, the predictive model may in fact have multiple potential execution pathways. The connections illustrated in FIG. 1 may represent the most probable (e.g. having the highest confidence) step using the current state of the predictive model. In some cases, FIG. 1 can illustrate multiple execution steps suggested by the predictive model, optionally with an indication of the relative confidence or probability of the potential steps. A user may thus be provided with more information regarding the process 100, which may be useful, for example, in manually configuring all or particular aspects of the process 100, or adjusting the predictive model. In further cases, during process execution, the next process component to be executed can be dynamically determined. In particular instances, rather than determining the entire execution order for the process at one time, the execution order can be determined dynamically on a component-by-component basis.

Example 3—Example Software Architecture

Figure 2:
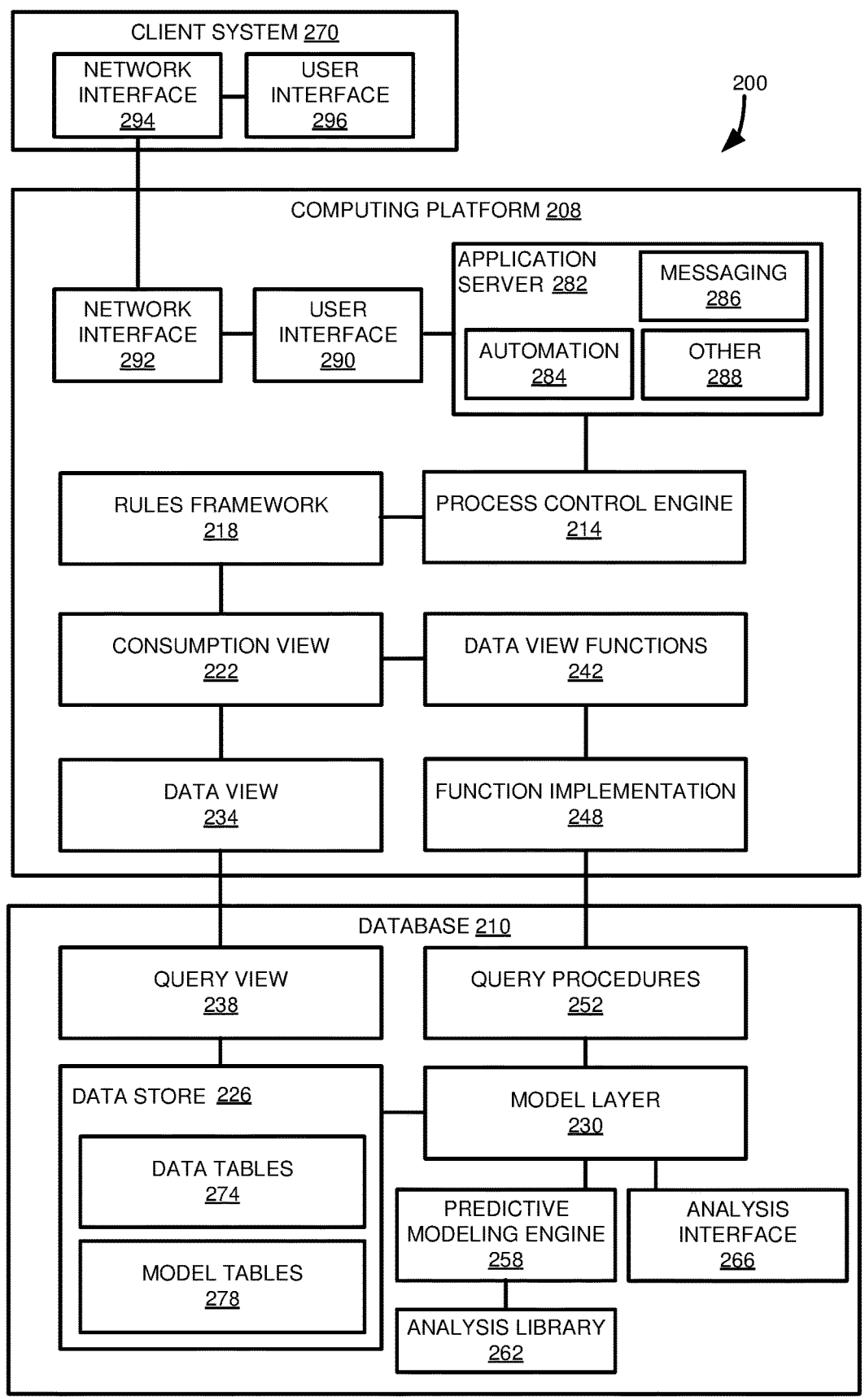
FIG. 2 is a block diagram illustrating an example software architecture in which a client system, a computing platform, and a database can interact in executing a process model specification using a process control engine according to a ruleset provided by a rules framework in communication with a predictive model of at least a portion of the process components of the process model specification.

FIG. 2 is a block diagram providing an example software architecture 200 that can be used in implementing at least certain embodiments of the present disclosure. The architecture 200 includes a computing platform 208 and a database 210. In specific examples, the computing platform 208 can be the S/4 HANA platform, and the database 210 can be the HANA database system, both of SAP SE of Walldorf, Germany.

The computing platform 208 can include a process control engine 214. The process control engine 214 can execute a process, such as the process 100 of FIG. 1 or a similar process. For example, the process control engine 214 can create instances of a process, collect data used in the process, and prompt a user to take actions to further the execution of the process.

A process may be specified by a model, which can be represented as a collection of nodes, with the nodes representing different steps of the process. In some cases, the nodes can be defined in a programming language or in a format otherwise useable by the process control engine 214. In at least some cases, the process model can utilize the Unified Modeling Language (UML) or Business Process Model and Notation (BPMN). In particular examples, the process can be specified using a graphical model. The process control engine 214 can include, or can interface with, other components for defining and executing a process, such as the WORKFLOW BUILDER of SAP SE of Walldorf, Germany.

In executing a process, the process control engine 214 can communicate with a rules framework 218. The rules framework 218 can include definitions for rules or decision steps used in executing a process with the process control engine 214. In particular examples, the rules framework 218 can be the BUSINESS RULE FRAMEWORK PLUS or the HANA RULES FRAMEWORK, both of SAP SE of Walldorf, Germany. The rules framework 218 can determine whether a particular decision, step, or other component of a process executed by the process control engine 214 should be executed using a heuristic or other defined rule or procedure of the rules framework or a rule or procedure supplied by a predictive model.

In some cases, the rules framework 214 can determine the appropriate sequence of steps for an entire process. In other cases, the rules framework 214 can determine the step sequence on a step-by-step basis. For instance, during execution of a particular instance of a process, the rules framework 218 can dynamically determine the appropriate next step in the process.

The rules framework 218 can be in communication with a consumption view 222 that can be generated using data stored in a data store 226 of the database 210 and the results of analyzing a model associated with the corresponding process of the process control engine 214. The model can be maintained and defined in a model layer 230 of the database 210. The consumption view 222 can represent a compilation of data and, optionally, transformation of the data into a format that can be read and manipulated by the process control engine 214 and other components of the architecture 200. In particular implementations, the consumption view 222 provides an interface for requests, such as requests using the ODATA protocol, from the process control engine 214, including requests originating at other components of the architecture 200. In a specific example, the consumption view 222 can be a CORE DATA SERVICES CONSUMPTION VIEW provided by the HANA database system and S/4 HANA platform of SAP SE of Walldorf, Germany.

The consumption view 222 can be generated in part from a data view 234, such as a CORE DATA SERVICES VIEW provided by the HANA database system and S/4 HANA platform of SAP SE of Walldorf, Del. The data view 234 can be a design-time object that aggregates, formats, or otherwise manipulates or presents data from one or more data sources. For example, the data view 234 can be constructed from one or more query views 238 provided by the database 210. For example, a query view 238 may represent a table, such as virtual table, generated from the response to a query request processed by the database 210, such as using structured query language (SQL) statements to retrieve data from the data store 226. In a specific example, the query view 238 can be a SQL VIEW provided by the SAP HANA database system, in particular the SAP HANA EXTENDED APPLICATION SERVICES, of SAP SE of Walldorf, Germany.

The consumption view 222 can also include data provided by predictive analytics associated with a process being executed or managed by the process control engine 214. In a particular example, the consumption view 222 can include or be associated with functions that define data to be included in the consumption view. The functions can be maintained by a data view functions component 242 which, in particular examples, can be a CDS TABLE FUNCTION of the S/4 HANA platform of SAP SE of Walldorf, Del. The data view function component 242 can, for example, allow structured query language functions to be included in the consumption view 222.

A particular function of the data view function component 242 can be associated with an object implementing the function associated with, or stored in, a function implementation component 248. In a particular example, the functions can be implemented in the ABAP programming language, such as an ABAP managed database procedure that can be used to manage or call stored procedures maintained in the database 210. More particularly, the function implementation 248 can be in communication with, and call or manage procedures stored in, a query procedures store 252 of the database 210.

At least a portion of the query procedures of the query procedure store 252 can interact with the model layer 230. For example, procedures of the query procedure store 252 can retrieve, and optionally manipulate, data associated with a model maintained by the model layer 230. In at least some cases, other components of the computing platform 208 can interact with the model layer 230, such to create, edit, manage, or delete models. In other cases, another components of the architecture 200 (including components not specifically illustrated in FIG. 2) can interact with the model layer 230 to carry out such actions.

In at least some cases, the model layer 230 can provide a framework for creating and manipulating models within the architecture 200, including models that can be used for predictive modeling, or models that can be used for other purposes. In a particular implementation, the model layer 230 is, or includes, the UMML4HANA or PREDICTIVE ANALYSIS INTEGRATION frameworks of SAP SE of Walldorf, Germany. In some cases, a single model may be used to model one or more aspects of a particular process of the process control engine 214. In other cases, multiple models can be used for a single process. For instance, different models may be associated with different steps of the process.

The model layer 230 can communicate with a predictive modeling engine 258 to carry out analyses associated with a model. In some cases, the predictive modeling engine 258 can execute analysis procedures stored in an analysis library 262. In particular examples, the analysis library can be the AUTOMATED PREDICTIVE LIBRARY, the PREDICTIVE ANALYSIS LIBRARY, or the APPLICATION FUNCTION LIBRARY of SAP SE of Walldorf, Germany. Non-limiting examples of predictive analysis techniques that can be used by the predictive modeling engine 258 include clustering, classification, regression, association, time series, preprocessing, statistics, social network analysis, and combinations thereof. In particular cases, the predictive analysis can include a machine learning component. Suitable machine learning techniques can include decision trees, artificial neural networks, instance-based learning, Bayesian methods, reinforcement learning, inductive logic programming, genetic algorithms, support vector machines, or combinations thereof.

In at least some cases, the predictive modeling engine 258 can apply multiple analysis techniques to a particular model. The analysis technique, or techniques to be used, can, in some aspects, be directly specified, such as by a user when constructing a model. In other aspects the predictive modeling engine 258 can determine which analysis technique should be used, or can analyze the model with multiple techniques. In a specific example, the predictive modeling engine 258 can apply an algorithm, such as structured risk minimization, to determine one or more analysis techniques that provide useful information.

The model layer 230 can optionally be in communication with an analysis interface 266. In some implementations, the analysis interface 266 can allow for creation or manipulation of models of the model layer 230. For example, the analysis interface 266 can be in communication with a client system 270. In further implementations, the analysis interface 266 can provide access to additional analysis tools or components. For instance, the analysis interface 266 can use machine learning capabilities provided by AMAZON WEB SERVICES (Seattle, Wash.), GOOGLE CLOUD PLATFORM (Google Inc., Mountain View, Calif.), MICROSOFT COGNITIVE SERVICES (Microsoft Corp, Redmond, Wash.), HPE HAVEN ON DEMAND (Hewlett Packard Enterprise Development LP, Palo Alto, Calif.), and IBM WATSON SERVICES ON BLUEMIX (IBM Corp., Armonk, N.Y.).

The data store 226 of the database 210 can include data, such as data used in a process associated with the process control engine 214. For example, the data can be stored in data tables 274. The data store 226 can also include data to be used by the model layer 230. In some cases, the model layer 230 can directly access data in the data tables 274. In other cases, database 210 can maintain data associated with the model layer 230 in model tables 278.

Returning to the computing platform 208, the process control engine 214 can be in communication with an application server 282 or similar component for providing access to the process control engine 214 to a user or external applications. The application server 282 can include specific components to execute functionality associated with the process control engine 214. For example, the application server 282 can provide an automation component 284 that can execute actions, decisions, or other components of a process of the process control engine 214 that do not require user intervention or other types of external feedback. For components of a process that may require external feedback, the application server 282 can include a messaging component 286 that can generate alerts, such as texts, emails, or alert on a user display related to the process. For instance, the messaging component 286 may provide a user with information regarding actions that need to be taken in order to advance the process. The application server 282 can include other components 288.

The application server 282 can be in communication with a user interface component 290 that can send information to, and receive information from, the client system 270, such as through a network interface 292. The user interface 290 can process commands for execution by the application server 282, or format information for consumption by the client system 270, including delivering or displaying messages generated by the messaging component 286.

The client system 270 can include a network interface 294 for communicating with other components of the architecture 200, including the computing platform 208. Although not shown, in some embodiments, the client system 270 can directly communicate with the database 210. The network interface 294 can communicate with a user interface 296. The user interface 296 can be used to display information to a user and to receive user commands in interacting with a process managed by the process control engine 214.

The architecture 200 can include more or fewer components than shown, and may be organized in other manners. For example, functionality of a particular component can be carried out by another component. In addition, in at least some cases, functionality can be carried out using multiple components. In a specific example, the functionality of two or more of the client system 270, the computing platform 208, and the database 210 can be combined in a single system.

The architecture of FIG. 2 can provide a number of advantages. One problem with use of machine learning or predictive modeling is that data, and often a large volume of data, may be needed to generate a useful model for defining a process. However, such data may not initially be available. Using the system of FIG. 2, a process can be defined initially using heuristic rules, including the use of heuristic rules for every step of the process. As the process is used, data can be accumulated in the data store 226, and used by the model layer 230. Once the model is sufficiently well developed, it may produce a process execution sequence that is more efficient or accurate than the original, heuristic-based process.

The process can be transitioned from a heuristic-based process to one that completely or partially uses the results of the predictive model. For example, as a user gains confidence in the predictive model, an increasing number of process steps can be selected for determination using the predictive model. Or, the rules framework 218 can include rules for determining when a predictive model, including as relates to individual process steps, is sufficiently developed that one or more steps of the process should be specified by the predictive model rather than the heuristic rules. In addition, the predictive model can be periodically retrained, such as by using updated data from the data store 226 based on additional use of the process. Thus, the rules suggested by the predictive model can be further refined, or additional heuristic steps replaced by steps determined using the predictive model.

The architecture of FIG. 2 can also allow a user to preview the process that may be produced by a predictive model, including one or more suggested next steps determined from the predictive model. The user can then determine which, if any, of the suggested steps should be used in place of heuristic rules. Or, the user can use the results of the predictive model to simulate a revised process before changing the specification for the process execution in the rules framework 218.

By separating process execution from the predictive model, such as using the rules framework 214 as an interface between the process control engine 214 and the model layer 230, the architecture 200 can decouple the process model and its execution from the predictive model. The process control engine 214 can always execute based on the rules framework 218, without needing to access (such as directly accessing) details of a predictive model. This arrangement can also simplify modification of process execution by a user. For example, a user may simply see the rule suggested by the predictive model, without needing to know, or having to interpret, the underlying details of the model.

Example 4—Example Determination of Process Rules from Process Objects

Figure 3:
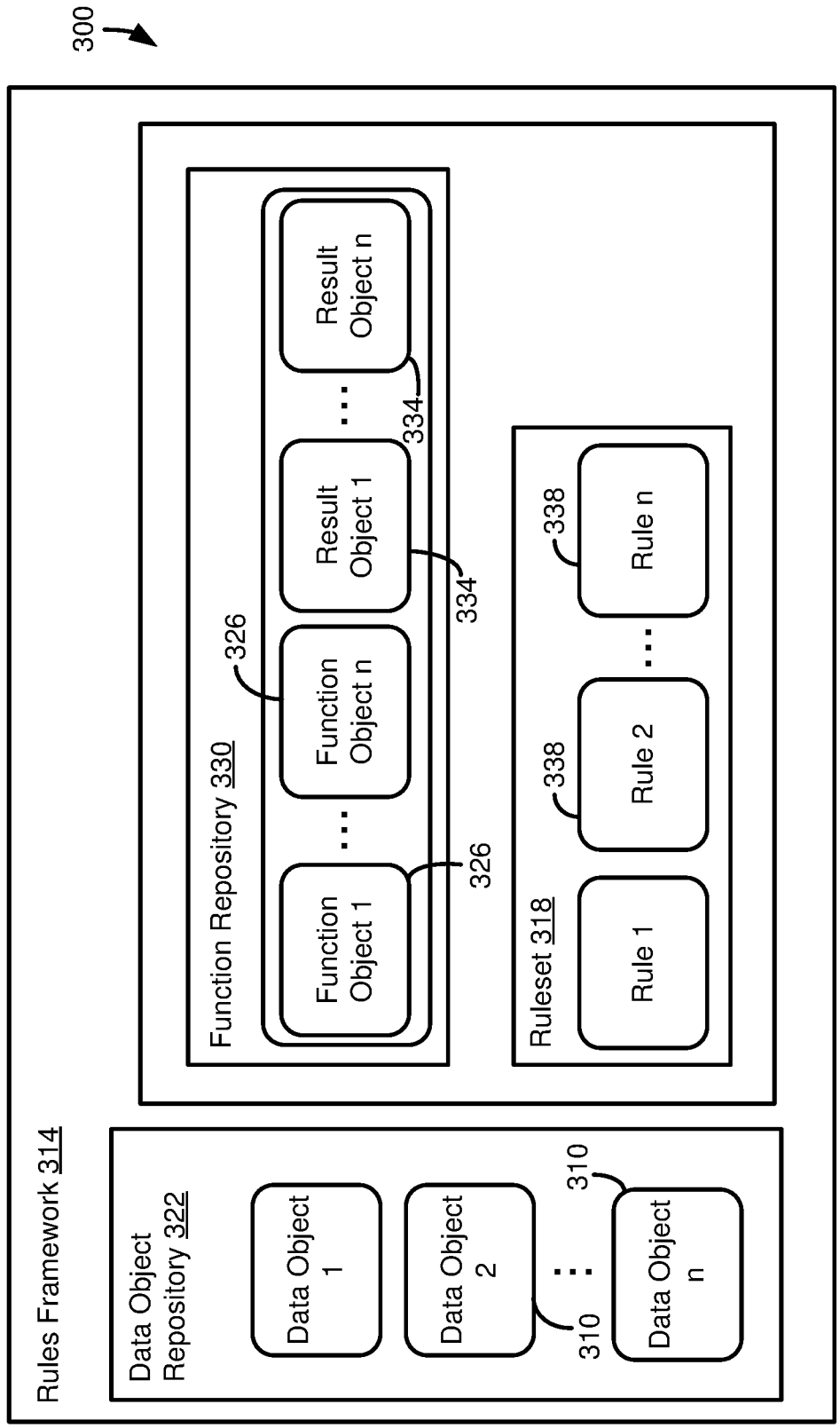
FIG. 3 is a diagram schematically depicting how, in a rules framework, a plurality of data objects and a plurality of data functions can be processed according to a plurality of rules of a rule set.

FIG. 3 schematically depicts a system 300 illustrating how a collection of data objects 310 can interact with a rules framework 314 (e.g., the rules framework 218 of FIG. 2) to create a rule set 318 that can be used by a process control engine, such as the process control engine 214.

The data objects 310 can be maintained in a repository 322. In some examples, the repository 322 can be a database, such as the database 210. In other examples, the repository 322 can be maintained in a different manner, including being maintained by another component of the architecture 200, such as a repository maintained in the computing platform 208.

The data objects 310 can represent or contain information related to various components, such as tasks, decision, or data items (e.g., individual data elements, or collections of data elements, such as information related to a particular individual or a particular account) associated with a process, such as a process executed or monitored using the process control engine 214. The data objects 310 can serve as input to one or more function objects 326 of a function repository 330. The function objects 326 can perform processing on one or more data objects 310, or other information, serving as input for the function object. In at least some cases, a function objects 326 can return a result object 334 that includes an outcome of rule processing. The data objects 310, function objects 326, and, optionally, results objects 334, can form a process model, or process model specification, for a process.

The function objects 330 can be associated with one or more rules 338 of the ruleset 318. The rules 338 can define actions to be taken in response to a particular function object 326, such as based on values associated with, or produced by, the function object. The rules 338 can specify actions to be taken, as well as the conditions under which the rule should be applied. Although not shown in FIG. 3, in at least some cases, the rules 338 can access additional data for use in carrying out the rule. The rules 338 can also return information to be incorporated in the result objects 334.

The system 300 can allow for decoupling of the data objects 310, function objects 326, and rules 338, which can facilitate creating and modifying a process, or the ruleset 318 used in executing, evaluating, or monitoring the process. In addition, the system 300 illustrates how a process, such as a process defined using the data objects 310, function objects 326, and result objects 334, can be decoupled from the basis of the ruleset 318. That is the rules 338 can include information relating to a predictive model, such as database fields associated with the predictive model, that can be used to evaluate whether a rule provided by the predictive model, or a heuristic rule, should be applied. Or, a user can choose to change the ruleset 318 so that a heuristic rule or a predictive model rule should apply to a particular process step (e.g., function object 326). In any event, these details, the basis for the ruleset 318, can be hidden from the process elements/function objects 326, which, again, can simplify the incorporation of predictive modeling into the execution of a process by the process control engine 214.

Example 5—Example Transition from Heuristic Model to Predictive Model

Figure 4:
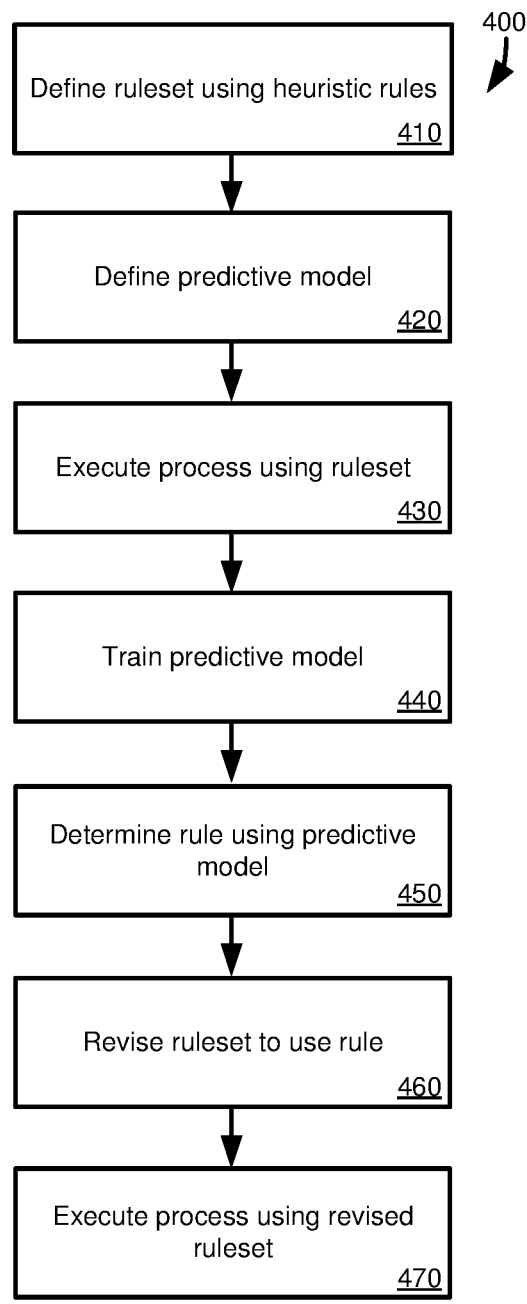
FIG. 4 is a flowchart of a method for revising a ruleset that includes a plurality of heuristic rules to incorporate at least one rule derived from a predictive model.

FIG. 4 illustrates a method 400 for incorporating rules derived from a predictive model into a ruleset used to execute a process, such as using the rules framework 218 of FIG. 2 (and the ruleset 318 of FIG. 3) and the process control engine 214. At 410, a ruleset is defined using heuristic rules. For example, the rules may be manually configured by a user, or using the results of an existing dataset (that is, the initial ruleset may be generated based on the analysis of the existing data set, including using a predictive model). In other examples, the initial ruleset can be generated in another manner.

At 420, a predictive model is defined that will be used to later modify the ruleset. The process is executed using the ruleset at 430. While the process is being executed, data is obtained, and used to train the predictive model at 440. A rule for the process specification can be determined from the predictive model at 450.

At 460, the ruleset is revised to use the results of the predictive model. For example, at least one rule of the ruleset can be changed from the heuristic rule to a rule determined by the predictive model. In some cases, the transition from a heuristic rule to a predictive model rule can be made by a user. In other cases, the transition can be made automatically, such as based on particular conditions being satisfied. The process is executed at 470 using the revised ruleset.

The method 400 can provide a number of advantages. Because the model 400 can start using heuristic rules, it avoids the use of a predictive model having no, or insufficient training data. Data obtained while heuristic rules are used can be used to train the predictive model. At a particular point, the rules suggested by the predictive model may be more efficient or accurate than the heuristic rules, and the ruleset can be modified to use one or more rules based on the predictive model. Thus, process execution can become "smarter" over time, and, at least in some cases, a user can determine whether confidence in the predictive model is sufficiently high to warrant incorporating rules suggested by the predictive model into the ruleset.

Example 6—Example Process Execution

Figure 5:
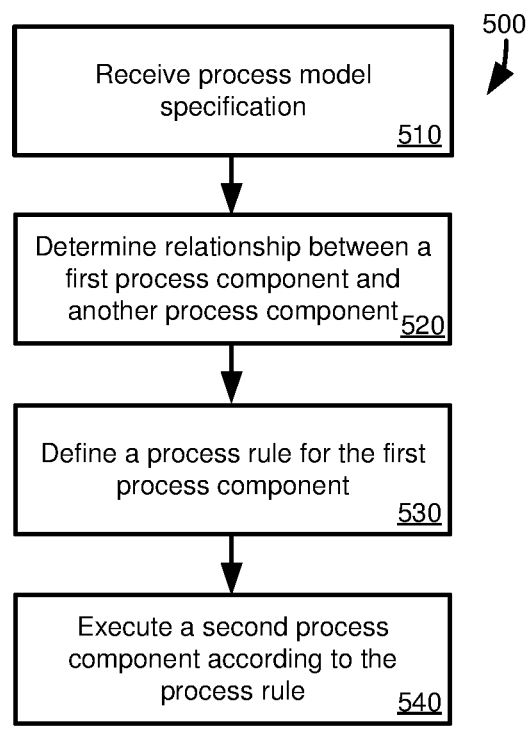
FIG. 5 is flowchart of a method for determining and executing a process rule for a process model specification.

FIG. 5 is a flowchart of an example method 500 for executing a process specification, such as using the process control engine 214 in cooperation with the rules framework 218 of FIG. 2. At 510, a process model specification is received. The process model includes a plurality of process components. The process model specification is associated with rules determining an execution order between process components. At least a portion of the rules are heuristic rules. In specific examples, all of the rules are initially heuristic rules.

At 520, a relationship is determined between a first process component and another process component using a predictive model. For example, the relationship may be a suggested rule defining the process step to be carried out after the first process step. A process rule is defined for the first process component at 530. The process rules includes the relationship determined from the predictive model or a heuristic rule. In some cases, determining can include determining that the relationship should not be used for the process rule. The second process step is executed according to the process rule at 540.

Example 7—Computing Systems

Figure 6:
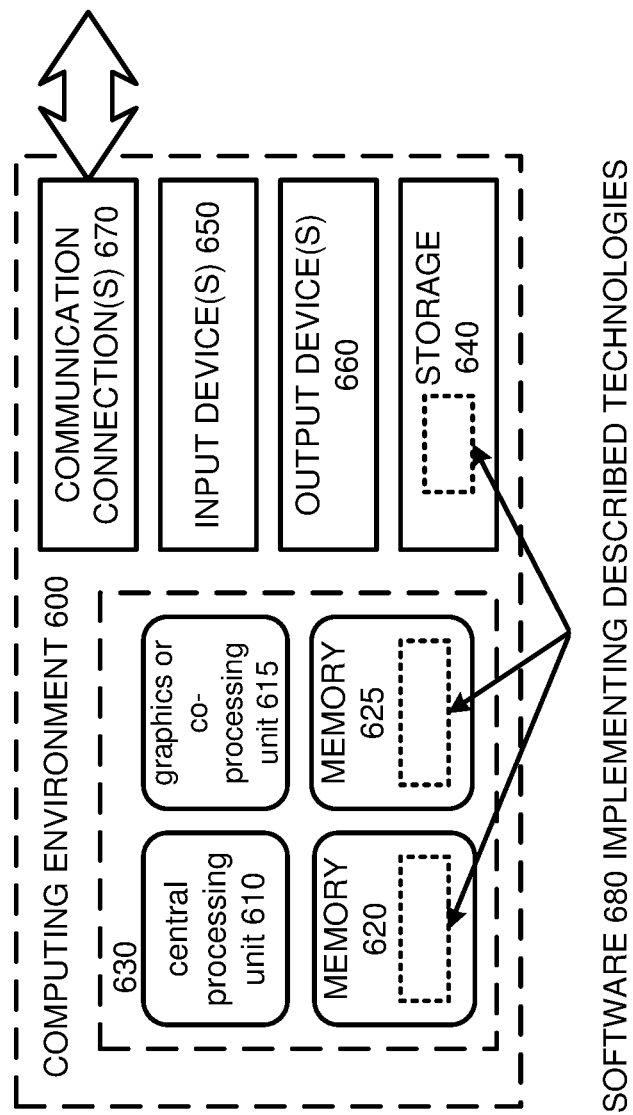
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the architecture 200 of FIG. 2, including the process control engine 214 and the rules framework 218. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615. The memory 620, 625, may also store database data, such as data associated with the database 210 of FIG. 2.

A computing system 600 may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 7:
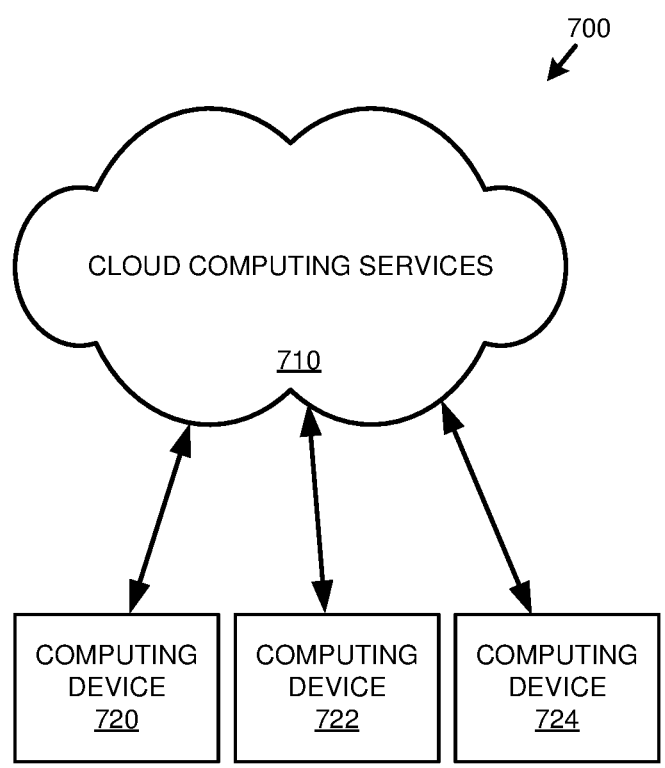
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
one or more memories;
one or more processing units coupled to the one or more memories; and
one or more computer readable storage media storing instructions that, when loaded into the memories, cause the one or more processing units to perform operations comprising:
receiving a specification of a process model, the process model comprising a plurality of process components;
determining a first relationship between a first process component of the plurality of process components and a second process component of the plurality of process components using a predictive model, the predictive model associated with at least a portion of the process model, including the first process component, and wherein the first process component is further associated with at least one heuristic rule;
defining a first process rule for the first process component, the first process rule specifying a third process component to be executed, wherein the third process component is the second process component or a process component of the plurality of process components other than the second process component, the first process rule being defined using the first relationship or a second relationship determined by the least one heuristic rule; and
executing a first process comprising multiple process components of the plurality of the process components, including executing the third process component according to the first process rule;
obtaining process execution data during the executing the first process;
training the predictive model with the process execution data;
determining a second relationship between the first process component and a fourth process component of the plurality of process components, wherein the fourth process component is the second process component, the third process component, or a process component of the plurality of process components other than the second process component or the third process component, using the predictive model trained with the process execution data;
defining a second process rule for the first process component, the second process rule specifying a fifth process component to be executed, wherein the fifth process component is the second process component, the third process component, the fourth process component, or a process component of the plurality of process components other than the second process component, the third process component, or the fourth process component, the second process rule being defined using the second relationship or a third relationship determined by at least a second heuristic rule, which is the at least one heuristic rule or is a heuristic rule other than the at least one heuristic rule; and
executing a second process comprising multiple process components of the plurality of process components, including executing the fifth process component according to the second process rule.

2. The computer system of claim 1, wherein determining a relationship between the first process component and the second process component using the predictive model comprises:
issuing a request for execution of a stored procedure in a database system.

3. The computer system of claim 2, wherein the request for execution of a stored procedure in the database system accesses the predictive model, and the predictive model is associated with multiple process components of the plurality of process components.

4. The computer system of claim 1, wherein the determining a relationship between the first process component and the second process component comprises requesting the analysis of the predictive model.

5. The computer system of claim 1, wherein the defining the first process rule comprises receiving user input selecting the first relationship or the at least one heuristic rule.

6. The computer system of claim 1, wherein the defining a first process rule for the first process component comprises evaluating a confidence level associated with a factor of the predictive model.

7. The computer system of claim 1, wherein the defining a first process rule for the first process component comprises determining whether a current date is later than a threshold date and, if the current date is later than the threshold date, selecting the first relationship as the first process rule.

8. The computer system of claim 1, wherein the defining the first process rule for the first process component comprises determining whether a number of data points analyzed by the predictive model exceeds a threshold, and, if the threshold is exceeded, selecting the first relationship as the first process rule, and selecting the at least one heuristic rule otherwise.

9. The computer system of claim 1, the operations further comprising:
generating a data aggregation comprising data associated with the process model and data associated with the predictive model.

10. The computer system of claim 1, wherein the defining the first process rule selects the at least one heuristic rule, the operations further comprising:
selecting at a later time the first relationship.

11. The computer system of claim 1, wherein the defining the first process rule selects the at least one heuristic rule, and wherein the process model is received with heuristic rules forming process rules specifying an order in which the process components should be executed.

12. The computer system of claim 1, wherein the predictive model is not directly associated with the process model.

13. The computer system of claim 1, wherein the determining a first relationship between the first process component and the second process component comprises determining relationships between the first process component and each of multiple other process components of the plurality of process components.

14. The computer system of claim 13, the operations further comprising:
displaying a plurality of the relationships to a user.

15. The computer system of claim 14, wherein the defining a first process rule for the first process component comprises receiving user input selecting one of the plurality of displayed relationships.

16. The computer system of claim 1, wherein the determining and the defining is carried out on a component-by-component basis for the process model specification as the process model specification is executed.

17. A method, implementing by at least one computing device comprising a memory and at least one processor coupled to the memory, comprising:
receiving a specification of a process model, the process model comprising a plurality of process components;
determining a first relationship between a first process component of the plurality of process components and a second process component of the plurality of process components using a predictive model, the predictive model associated with at least a portion of the process model;
defining a first process rule for the first process component, the first process rule specifying a third process component to be executed, wherein the third process component is the second process component or a process component of the plurality of process components other than the second process component, the first process rule being defined using the first relationship or a second relationship determined by at least one heuristic rule; and
executing a first process comprising multiple process components of the plurality of the process components, including executing the third process component according to the first process rule;
obtaining process execution data during the executing the first process;
training the predictive model with the process execution data;
determining a second relationship between the first process component and a fourth process component of the plurality of process components, wherein the fourth process component is the second process component, the third process component, or a process component of the plurality of process components other than the second process component or the third process component, using the predictive model trained with the process execution data;
defining a second process rule for the first process component, the second process rule specifying a fifth process component to be executed, wherein the fifth process component is the second process component, the third process component, the fourth process component, or a process component of the plurality of process components other than the second process component, the third process component, or the fourth process component, the second process rule being defined using the second relationship or a third relationship determined by at least a second heuristic rule, which is the at least one heuristic rule or is a heuristic rule other than the at least one heuristic rule; and
executing a second process comprising multiple process components of the plurality of process components, including executing the fifth process component according to the second process rule.

18. The method of claim 17, wherein the defining the first process rule comprises determining whether a number of data points analyzed by the predictive model exceeds a threshold, and, if the threshold is exceeded, selecting the first relationship as the first process rule, and selecting the at least one heuristic rule otherwise.

19. One or more computer readable storage media comprising:
computer-executable instructions that, when executed by a computing system, cause the computing system to receive a specification of a process model, the process model comprising a plurality of process components;
computer-executable instructions that, when executed by the computing system, cause the computing system to determine a first relationship between a first process component of the plurality of process components and a second process component of the plurality of process components using a predictive model, the predictive model associated with at least a portion of the process model;
computer-executable instructions that, when executed by the computing system, cause the computing system to define a first process rule for the first process component, the first process rule specifying a third process component to be executed, wherein the third process component is the second process component or a process component of the plurality of process components other than the second process component, the first process rule being defined using the first relationship or a second relationship determined by at least one heuristic rule; and
computer-executable instructions that, when executed by the computing system, cause the computing system to execute a first process comprising multiple process components of the plurality of the process components, including executing the third process component according to the first process rule;
computer-executable instructions that, when executed by the computing system, cause the computing system to obtain process execution data during the executing the first process;
computer-executable instructions that, when executed by the computing system, cause the computing system to train the predictive model with the process execution data;
computer-executable instructions that, when executed by the computing system, cause the computing system to determine a second relationship between the first process component and a fourth process component of the plurality of process components, wherein the fourth process component is the second process component, the third process component, or a process component of the plurality of process components other than the second process component or the third process component, using the predictive model trained with the process execution data;
computer-executable instructions that, when executed by the computing system, cause the computing system to define a second process rule for the first process component, the second process rule specifying a fifth process component to be executed, wherein the fifth process component is the second process component, the third process component, the fourth process component, or a process component of the plurality of process components other than the second process component, the third process component, or the fourth process component, the second process rule being defined using the second relationship or a third relationship determined by at least a second heuristic rule, which is the at least one heuristic rule or is a heuristic rule other than the at least one heuristic rule; and
computer-executable instructions that, when executed by the computing system, cause the computing system to execute a second process comprising multiple process components of the plurality of process components, including executing the fifth process component according to the second process rule.

20. The one or more computer readable storage media of claim 19, wherein the defining the first process rule comprises determining whether a number of data points analyzed by the predictive model exceeds a threshold, and, if the threshold is exceeded, selecting the first relationship as the first process rule, and selecting the at least one heuristic rule otherwise.

* * * * *